United States Patent Office 3,101,221
Patented Aug. 20, 1963

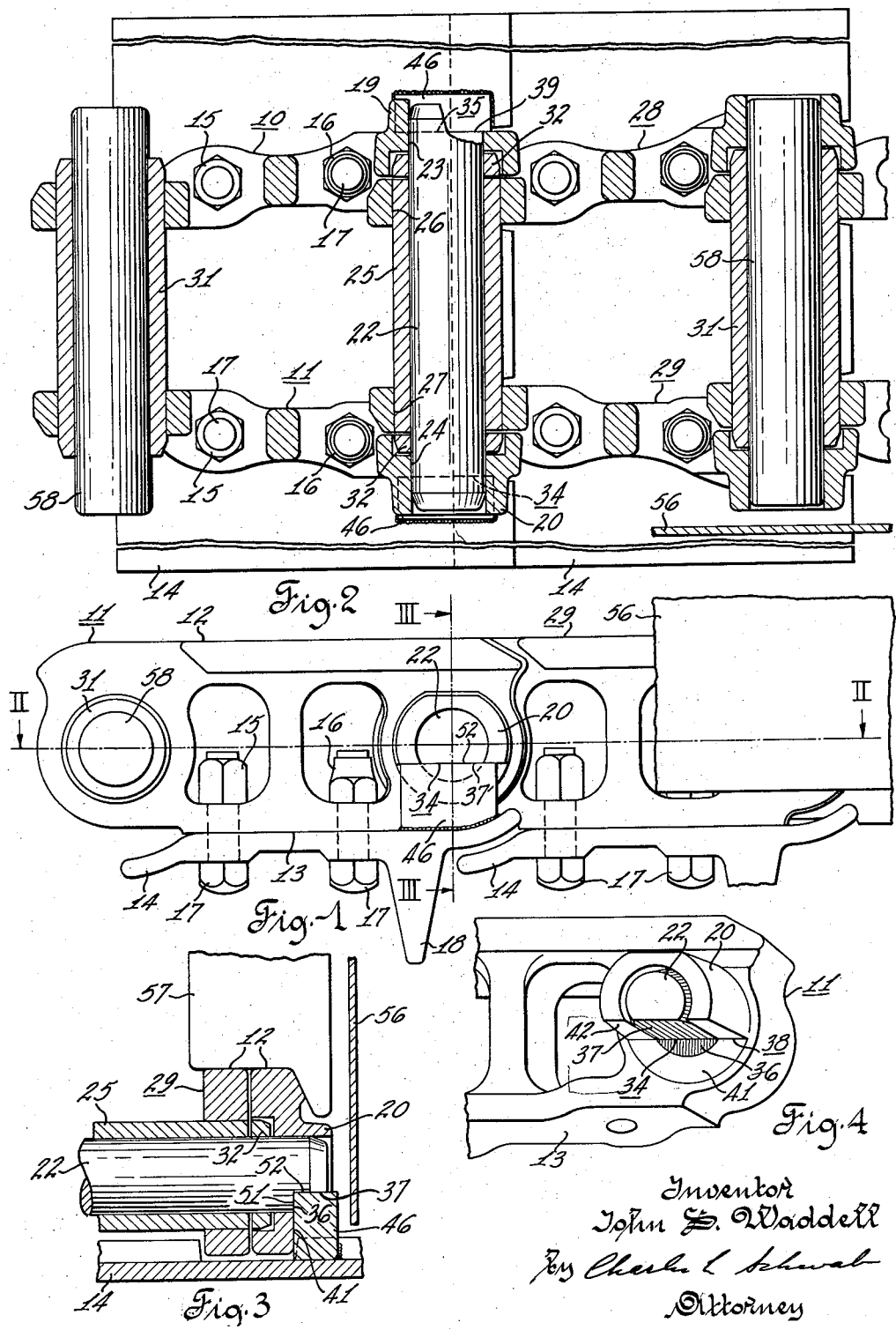

3,101,221
MASTER LINK FOR ENDLESS TRACK
John S. Waddell, Rochester, Ill., assignor to Allis-Chalmers Manufacturing Company, Milwaukee, Wis.
Filed June 27, 1961, Ser. No. 119,890
9 Claims. (Cl. 305—54)

This invention relates to a master link for an endless track of the type used on a crawler tractor.

Heretofore, considerable difficulty has been experienced in providing a satisfactory master link in a pin and bushing type track. In a pin and bushing track each link includes a pair of side bars bolted to a shoe, a pin press fit in bores at corresponding ends of the side bars and a bushing similarly installed in the other end of the side bars. The pin of each link pivots in the bushing of the adjoining link. It is important in this type track that pivotal movement occur only between the pin and bushing. If the pin or bushing turns in the side bar bores in which they are press fit the bore would rapidly wear to an oversize condition causing rapid track deterioration.

It has been a conventional practice to provide a master pin whereby, upon its being removed, the track can be separated. One such arrangement is to provide a short bushing which does not extend into the bosses of the adjoining side bars thereby permitting separation of the adjoining links upon the pin being driven out of its press fit condition with the side bars. A dilemma has faced the designer of master links in that if the pin has a sufficiently tight press fit with the side bars to prevent rotation therebetween, then it is difficult to remove the pin when it is desired to separate the track for servicing or replacement. Heretofore, various arrangememts have been suggested wherein the pin is locked to the side bars in a releasable fashion so that upon release of the locking means the pin may be easily removed from the bores of the side bars. These prior suggested devices however, have been excessively expensive to produce and usually reduce the strength of the components to such an extent that the track is weakened at the master link.

It is an object of this invention to provide an improved master link for a track, wherein the master pin is nonrotatably secured against rotation relative to the side bars in which it fits.

It is a further object of this invention to provide an improved and low cost master link for a track wherein the master pin is releasably locked against axial displacement and against rotation relative to the side bars in which it fits.

It is a further object of this invention to provide a master link for an endless track, wherein cooperating abutments are formed on the pin and shoe of the master link to prevent endwise displacement of the pin and prevent rotation of the pin relative to the master link side bars when the master link components are in an assembled condition.

It is a further object of this invention to provide a master link which is as strong and long lived as the other links of the track, is low cost and permits the track to be separated with minimum effort.

It is a further object of this invention to provide a master link for an endless track which employs a locking arrangement between the pin and shoe which is confined in its positioning so that it does not interfere with other parts of the crawler tractor.

These and other objects of this invention will be apparent to those familiar with the art upon reading the following description in conjunction with the drawings in which:

FIG. 1 is a side view of that portion of an endless track containing a master link;

FIG. 2 is a section taken along lines II—II of FIG. 1;

FIG. 3 is a section taken along the lines III—III of FIG. 1; and

FIG. 4 is a pictorial view of one end of a master pin and associated master side bar.

Referring to FIGS. 1 and 2, the master link of this invention is shown incorporated in a pin and bushing type endless track. The master link side bars 10, 11 have rail surfaces 12 at their upper side and shoe mounting surfaces 13 at their lower side for abutment with master shoe 14 secured thereto by nuts 15, 16 and bolts 17. As is conventional, the shoe has an outwardly projecting cleat 18 for traction purposes. Accordingly the shoes are traction members or may be referred as ground engaging shoes. Corresponding ends of the master link side bars 10, 11 have coaxial pin bores 23, 24 through their outwardly extending bosses 19, 20. A master pin 22 has its opposite ends press fit in the bores 23, 24 and the ends of the pin terminate at approximately the axially outer termini of the bores. The master pin has a snug fit in the bores 23, 24 as compared with a substantial press fit of the other pins of the track in their bores. A snug fit permits relatively easy removal of the master pin 22 from the bores 23, 24 of the master link side bars 10, 11.

A master bushing 25 is press fit in bushing bores 26, 27 at the ends of the standard side bars 28, 29. As is conventional, the master bushing 25 is shorter in axial length than the standard bushing 31 of the other track links. A pair of spacers 32 are provided, as is customary, in the master link for proper spacing of the connecting pairs of side bars 10, 11 and 28, 29.

Referring also to FIGS. 3 and 4, downwardly facing notches 34, 35 are formed in opposite ends of the master pin 22. Notch 34 is defined by a radially extending surface 36 and an axially or transversely extending surface 37 normal thereto. Notches 38, 39 are also cut in the bosses of master link side bars 10, 11 in aligned relation to notches 34, 35 in the pin. Notch 38 is defined by a radially extending surface 41 and transversely extending surface 42. In order to prevent rotary and axial movement of the master pin 22, ears 46 are integrally formed on the master shoe 14 so as to be disposed in complementary abutting relation to the notches in opposite ends of the pin 22 and in the master side bars 10, 11. The locking ears 46 are formed by welding a pair of axially spaced blocks to the shoe 14. As seen in FIG. 3, ear 46 presents a vertically disposed abutment surface 51 in axially confronting and abutting relation to the radial surfaces 36, 41 on the master pin 22 and side bar 11. Similar abutting surfaces are presented by the ear 46 fitting in notches 35, 39. Thus it is seen that master pin 22 is blocked against axial movement by virtue of the vertically disposed abutting surfaces of the ears 46 and the master pin is held against rotation by virtue of the axially extending surfaces formed on top of the ears 46. When the master shoe 14 is removed from the master link side bars 10, 11 by removal of nuts 15, 16 from the bolts 17, the ears 46 will be removed from their engaging relation with the notches formed in the opposite ends of the master pin 22 and then the master pin can be easily driven from its snug fit engagement with the bores 23, 24 of the master side bars 10, 11.

As shown in FIG. 3, the ears 46 are disposed substantially within the axial dimension of the master pin 22 thereby preventing any interference with the truck wheel guard 56 conventionally placed at the axially outer side of the truck wheel 57 and side bars 10, 11. This is possible by providing a master pin which is approximately the same length as the other pins 58 and by cutting a notch in the bosses of the master side bars 10, 11. The master side bars 10, 11 are otherwise similar to the other side bars of the track with the exception of slightly larger pin bores, should the master pin be of the same diameter as the other track pins. The snug fit connection could of course be accomplished by making the master pin 22 slightly undersized relative to the other standard pins, thereby permitting the master side bar pin bores to be standard.

The master link of this invention is conveniently simple, thereby making it possible to provide a superior master link at a very reasonable cost. The cost of providing separate releasable locking means for the master pin are avoided by putting locking ears on the master shoe thereby making double use of the nuts and bolts attaching the shoe. The ears 46 are welded to an otherwise standard shoe and the master link pin and side bars may be made by modifying standard components. The superiority of the master link of this invention lies in its being inexpensive to provide, its giving long trouble free service, its being strong, its effectiveness in preventing the master pin from rotating relative to the side bar and in its preventing axial shifting of the master pin relative to the side bar.

Although a single embodiment of this invention has been illustrated, it is not intended to limit this invention except as necessitated by the scope of the appended claims.

What is claimed is:

1. A master link for a pin and bushing type endless track comprising: a pair of transversely spaced side bars each having a rail surface at its upper side and a shoe mounting surface at its lower side, walls defining a pin bore at one end of each of said side bars, a pin having its opposite ends mounted in said bores, respectively, a ground engaging shoe releasably secured to said lower side of said side bars independently of said pin, and cooperating abutment surfaces formed on said shoe and pin, respectively, preventing endwise and rotational movement of said pin relative to said shoe and side bars.

2. A master link for a pin and bushing type endless track comprising: a pair of transversely spaced side bars each having a rail surface at its upper side and a shoe mounting surface at its lower side, walls defining a pin bore at one end of each of said side bars, said bores having a common transverse axis, a transversely extending cylindrical pin having its opposite ends mounted in said bores, respectively, a ground engaging shoe releasably secured to said lower side of said side bars independently of said pin, transversely extending abutment surfaces on said shoe and on one end of said pin, respectively, in abutting relation to one another, other abutment surfaces on said shoe and pin in axially abutting relation to one another, said surfaces preventing axial and rotational movement of said pin relative to said shoe and side bars.

3. A master link for a pin and bushing type endless track comprising: a pair of transversely spaced side bars, each having an upper rail surface and a bottom shoe mounting surface, walls defining a pin bore at one end of each of said side bars, said bores having a common transverse axis, a transversely extending cylindrical pin having its opposite ends press fit in said bores, respectively, a ground engaging shoe releasably secured to said bottom surface of said side bars, upward and downward facing abutment surfaces on said shoe and one end of said pin, respectively, in abutting relation to one another, and other abutment surfaces on said shoe and pin in axially abutting relation to one another, said surfaces preventing axial and rotational movement of said pin relative to said shoe and side bars.

4. A master link for a pin and bushing type endless track comprising: a pair of spaced side bars each having a rail surface on one side and a shoe mounting surface on its opposite side, walls defining a pin bore at one end of each of said side bars, a pin having its opposite ends mounted in said bores, respectively, and presenting a notch at each of its opposite ends, a ground engaging shoe in abutting relation to said shoe mounting surfaces of said side bars, means releasably securing said shoe to said side bars independently of said pin, and ears formed on said shoe and extending into said notches thereby preventing endwise movement of said pin and preventing rotation of said pin relative to said shoe and side bars.

5. The structure set forth in claim 4 wherein said ears are disposed transversely approximately within the length of said pin.

6. The structure set forth in claim 4 wherein said notches face toward said shoe.

7. A master link for a pin and bushing type endless track comprising: a pair of transversely spaced side bars each having a rail surface on one side and a shoe mounting surface on its opposite side, outwardly extending pin bosses on corresponding ends of said side bars, walls on said side bars defining coaxial pin bores through said bosses, a pin having its opposite ends mounted in said bores, respectively, said pin ends terminating at approximately the axially outer termini of said bores, respectively, a ground engaging shoe in abutting relation to said shoe mounting surfaces of said side bar, means releasably securing said shoe to said side bars independently of said pin, surfaces defining aligned notches, respectively, in one end of said pin and in said boss associated therewith, and an ear integrally formed on said shoe and fitting into said notches in abutting relation to said surfaces defining said notches to thereby prevent relative rotation of said pin and shoe.

8. The structure set forth in claim 7 and further comprising surfaces defining other aligned notches, respectively, in the other end of said pin and the boss of the other side bar and another ear integrally formed on said shoe and fitting into said other notches in abutting relation to said surfaces defining same.

9. The structure set forth in claim 8 wherein said notches face said shoe and said ears are disposed to lie approximately within the axial dimension of said pin.

References Cited in the file of this patent

UNITED STATES PATENTS

| | | |
|---|---|---|
| 1,258,601 | Norelius | Mar. 5, 1918 |
| 1,450,478 | Arthur | Apr. 3, 1923 |
| 1,507,757 | Savage | Sept. 9, 1924 |
| 1,737,823 | Bodle | Oct. 6, 1928 |
| 2,416,564 | Bechman | Feb. 25, 1947 |
| 2,623,399 | Barrett | Dec. 30, 1952 |

FOREIGN PATENTS

| | | |
|---|---|---|
| 810,447 | France | Dec. 28, 1936 |
| 1,218,140 | France | Dec. 14, 1959 |